United States Patent
Deelstra

(10) Patent No.: US 7,044,079 B2
(45) Date of Patent: May 16, 2006

(54) DEVICE FOR AUTOMATICALLY MILKING AN ANIMAL

(75) Inventor: Jentje Deelstra, Rijswijk (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 10/769,896

(22) Filed: Feb. 3, 2004

(65) Prior Publication Data

US 2004/0168645 A1 Sep. 2, 2004

(30) Foreign Application Priority Data

Feb. 3, 2003 (NL) .................................. 1022565

(51) Int. Cl.
*A01J 5/017* (2006.01)

(52) U.S. Cl. ..................................... 119/14.1

(58) Field of Classification Search ............. 119/14.1, 119/14.08, 608
See application file for complete search history.

(56) References Cited

U.S. PATENT DOCUMENTS

| | | | |
|---|---|---|---|
| 4,685,422 A * | 8/1987 | Middel et al. ........... | 119/14.13 |
| 4,726,322 A | 2/1988 | Torsius | |
| 4,867,103 A * | 9/1989 | Montalescot et al. .... | 119/14.08 |
| 5,042,428 A * | 8/1991 | Van der Lely et al. ... | 119/14.08 |
| 5,678,506 A * | 10/1997 | van der Berg et al. ... | 119/14.18 |
| 5,778,820 A * | 7/1998 | van der Lely et al. .... | 119/14.18 |
| 5,862,776 A * | 1/1999 | van den Berg ............ | 119/14.1 |
| 5,865,138 A | 2/1999 | van der Lely | |
| 5,918,566 A * | 7/1999 | van den Berg ........... | 119/14.02 |
| 5,967,081 A * | 10/1999 | Street et al. ............. | 119/14.08 |
| 6,009,833 A * | 1/2000 | van der Lely ........... | 119/14.02 |
| 6,205,949 B1 | 3/2001 | van den Berg | |
| 6,213,051 B1 * | 4/2001 | Fransen ................... | 119/14.08 |
| 6,386,141 B1 * | 5/2002 | Forsen et al. ............ | 119/14.08 |
| 6,443,094 B1 * | 9/2002 | DeWaard ................. | 119/14.18 |

FOREIGN PATENT DOCUMENTS

| | | |
|---|---|---|
| EP | 0194 729 A | 9/1986 |
| EP | 0 519 444 A | 12/1992 |
| EP | 0 635 203 A | 1/1995 |
| EP | 0 990 385 A | 4/2000 |
| EP | 1 188 367 A | 3/2002 |
| EP | 1 279 327 A | 1/2003 |
| SU | 1484333 A | 6/1989 |

* cited by examiner

*Primary Examiner*—Robert P. Swiatek
(74) *Attorney, Agent, or Firm*—Howrey LLP; David P. Owen; Jacobus C. Rasser

(57) ABSTRACT

A robot arm construction is provided with a robot arm for carrying a teat cup, which robot arm can be pivoted under the udder of the animal. The robot arm construction is provided with a first robot arm construction portion, a second robot arm construction portion, a first horizontal axis for enabling a pivoting movement of the first robot arm construction portion, and a second horizontal axis by means of which the second robot arm construction portion is pivotably connected to the first robot arm construction portion. The robot arm is connected to the second robot arm construction portion.

22 Claims, 2 Drawing Sheets

DEVICE FOR AUTOMATICALLY MILKING AN ANIMAL

CROSS REFERENCE TO RELATED APPLICATIONS

This application claims priority from Dutch patent application number NL 1022565 filed on 3rd Feb. 2003, the contents of which are hereby incorporated by reference in their entirety.

BACKGROUND OF THE INVENTION

1. Field of the Invention

The invention relates generally to devices for automatically milking animals and more particularly to a milking parlour and a milking robot comprising a robot arm construction for automatically connecting a teat cup to a teat of an animal to be milked.

2. Description of the Related Art

Devices are known for automatically milking animals in which a robot arm can be pivoted in a horizontal plane under the udder of the animal. In such known arrangements, in addition to means for moving the entire robot arm construction in the longitudinal direction of the milking parlour, there may be provided actuators for moving the robot arm in the vertical direction and in two co-ordinates in the horizontal plane. Such a device is known from European Patent Application EP A 0 519 544.

BRIEF SUMMARY OF THE INVENTION

The present invention aims to provide an alternative robot arm construction for such a device.

According to the invention for this purpose there is provided a device for device for use in a milking parlour for automatically milking an animal using a milking robot the device comprising a robot arm construction for automatically connecting a teat cup to a teat of the animal to be milked, the robot arm construction comprising: a first robot arm construction portion; a second robot arm construction portion; a first generally horizontal axis at which the first robot arm construction portion pivots; a second generally horizontal axis at which the second robot arm construction portion is pivotably connected to the first robot arm construction portion; a third robot arm construction portion for carrying a teat cup, the third robot arm construction portion being connected to the second robot arm construction portion for pivotable movement under the udder of the animal; and a first actuator having a first point of application on the first robot arm construction portion and having a second point of application located below the first generally horizontal axis and below the first point of application.

Although the first horizontal axis or shaft may be disposed on a ceiling or on the floor of the device, for the sake of simplicity of the construction it is advantageous if the device comprises a fencing that surrounds the milking parlour, the first horizontal axis being pivotably connected to an upper side of the fencing, and the second horizontal axis or shaft being located outside the milking parlour.

In an embodiment of a device according to the invention the robot arm construction comprises a first actuator having a first point of application on the first robot arm construction portion and having a second point of application on the fencing in a place at a first distance under the first horizontal axis. Furthermore the robot arm constriction may comprises a second actuator having a first point of application on the second robot arm construction portion and having a second point of application on the fencing in a place at a second distance under the first horizontal axis, the second distance being less than the first distance. Due to this third robot arm construction portion can be moved in a highly accurate and stable manner.

The actuators are preferably operating cylinders such as hydraulic or pneumatic operating cylinders.

The first point of application is located in particular on the second robot arm construction portion at least approximately half-way the second robot arm construction portion.

For obtaining predominantly horizontal movement of the third robot arm construction portion under the udder of an animal in the milking parlour it is advantageous if the first point of application on the second robot arm construction portion is located on the side of the second robot arm construction portion located opposite the fencing.

For obtaining accurate movement of the third robot arm construction portion and for obtaining a stable robot arm construction it is advantageous if the first point of application on the first robot arm construction portion is located closer to the second horizontal axis than to the first horizontal axis. The first point of application on the first robot arm construction portion preferably faces the robot arm.

In an embodiment of a device according to the invention the robot arm constriction is provided with a supporting unit that is movable along a rail that is preferably fastened to the fencing, which supporting unit is engaged by the first horizontal axis, the second horizontal axis, the second point of application of the first actuator and the second point of application of the second actuator. Due to this the third robot arm construction portion can be moved in the longitudinal direction of the milking parlour for obtaining the correct position.

In order to counteract a rotating movement of the robot arm construction relative to the supporting unit it is advantageous if the supporting unit is movable along two rails that are disposed at different levels, preferably on the fencing of the milking parlour.

Although the supporting unit may be movable by means of a motor, the supporting unit is preferably movable along the rails by means of a third actuator.

Although the robot arm construction may be operated with the aid of historical data, for the sake of accuracy of positioning of the third robot arm construction portion it is advantageous if the device is provided with a position-determining device for determining the position of a teat of a cow, at least one actuator being controllable with the aid of data from the position-determining device. Of course historical data can also be used to control the actuator.

BRIEF DESCRIPTION OF THE DRAWINGS

An exemplary embodiment of the invention will now be described in further detail with reference to the accompanying figures, in which.

DESCRIPTION OF ILLUSTRATIVE EMBODIMENTS

Figure 1:
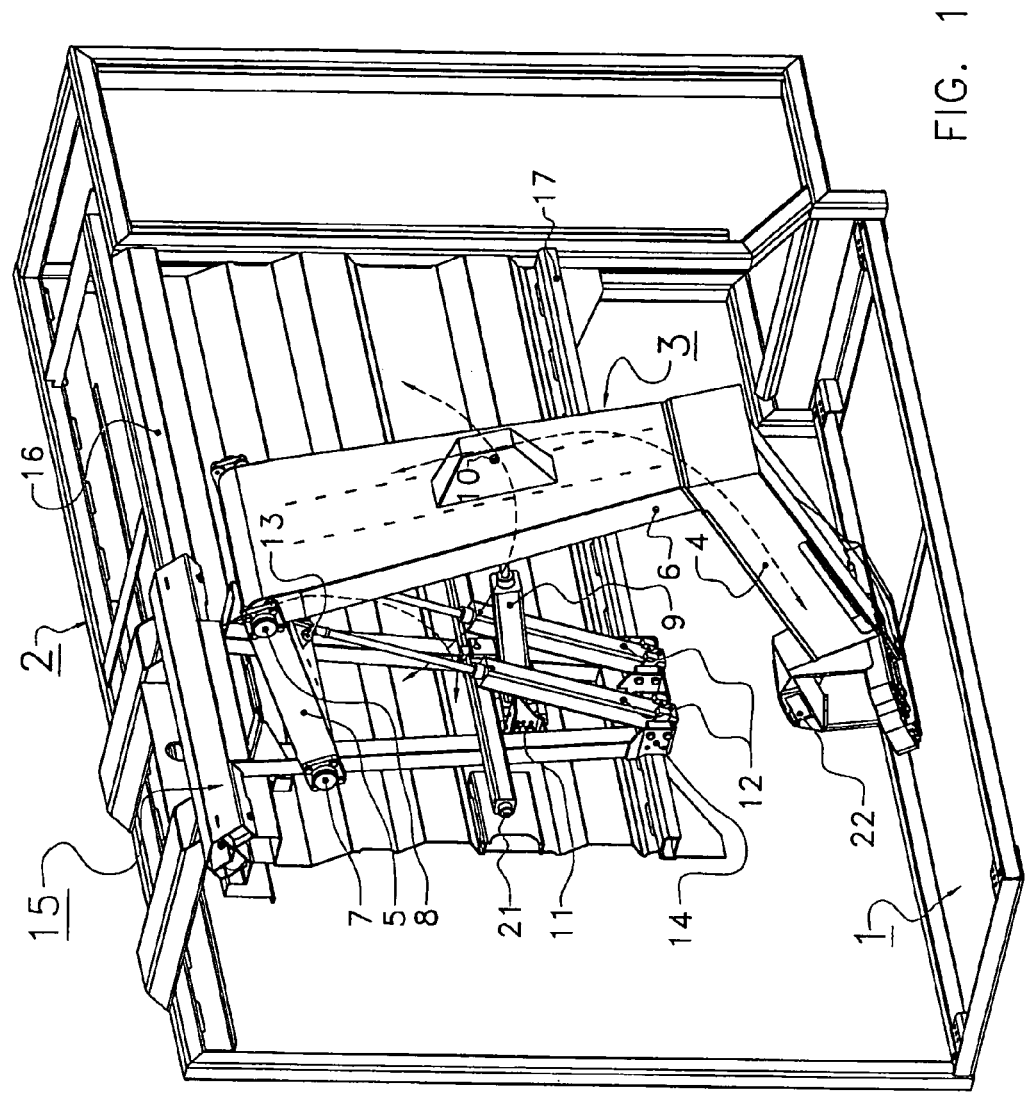
FIG. 1 shows diagrammatically in a perspective view a device with robot arm construction according to the invention.
Figure 2:
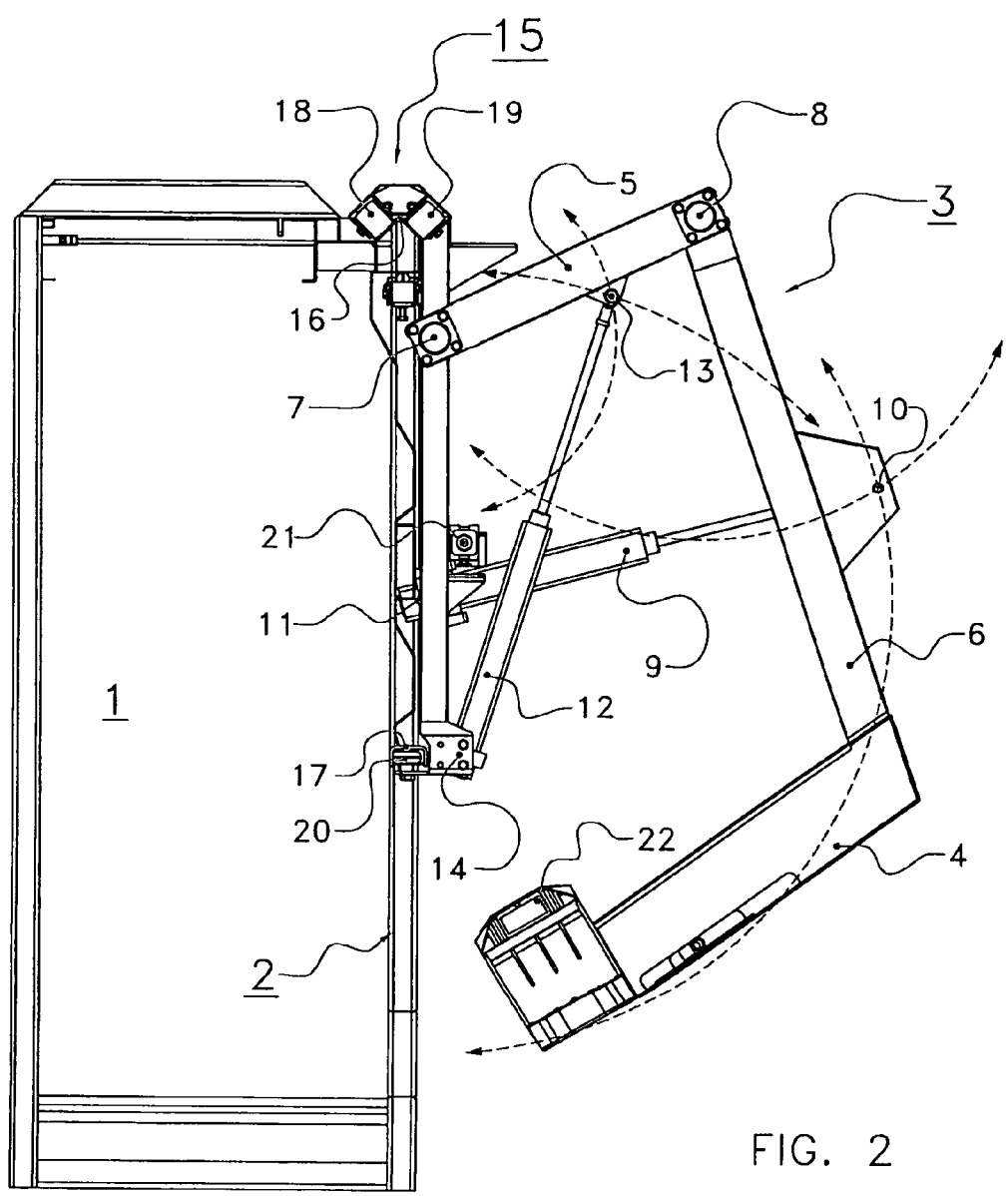
FIG. 2 is a front view of the device shown in FIG. 1.

The device for automatically milking an animal, such as a cow, shown diagrammatically in a perspective view in FIG. 1, comprises a milking parlour 1 that can accommodate one single animal, such as a cow. Said milking parlour 1 is surrounded in a customary manner by a fencing 2 and is provided with an entrance and an exit door that are not further shown in the figures. In the milking parlour 1 or in the immediate vicinity thereof there is provided a milking robot comprising a robot arm construction 3 for automatically connecting a teat cup to a teat of an animal to be milked. The robot arm construction is provided with a third robot arm construction portion 4 for carrying a teat cup, which robot arm is pivotable under the animal's udder.

The robot arm construction 3 is provided with a first robot arm construction portion 5 and a second robot arm construction portion 6. The first robot arm construction portion 5 is pivotably connected to an upper side of the fencing 2 by means of a first horizontal axis 7. The second robot arm construction portion 6 is pivotably connected to the first robot arm construction portion 5 by means of a second horizontal axis 8 that is located outside the milking parlour 1. The third robot arm construction portion 4 is connected to the second robot arm construction portion 6. The robot arm may rigidly be connected to the second robot arm construction portion or be connected thereto via a third horizontal and/or a vertical axis or shaft, so that the robot arm is pivotable relative to the second robot arm construction portion for example by means of an actuator.

A first actuator 12 has a first point of application 13 on the first robot arm construction portion 5 and a second point of application 14 on the fencing 2 in a place at a first distance under the first horizontal axis 7. A second actuator 9 has a first point of application 10 on the second robot arm construction portion 6 and a second point of application 11 on the fencing 2 in a place at a second distance under the first horizontal axis 7, the second distance being less than the first distance. The first actuator 12 may be a single actuator or may be constituted by two actuators that are arranged on either side of the second actuator 9, as is apparent from FIG. 1. The first point of application 10 on the second robot arm construction portion 6 is then located at least approximately half-way along the second robot arm construction portion 6. For obtaining an almost horizontal movement of the free end of the third robot arm construction portion 4 the first point of application 10 on the second robot arm construction portion 6 is located on the side of the second robot arm construction portion 6 located opposite the fencing 2. The first point of application 13 on the first robot arm construction portion 5 is located closer to the second horizontal axis than to the first horizontal axis. For obtaining a relatively compact construction the first point of application 13 on the first robot arm construction portion faces the robot arm.

The robot arm construction 3 is movable in the longitudinal direction of the milking parlour by means of a supporting unit 15 that is movable along rails 16 and 17. The rail 16 is arranged on the upper side of the fencing 2 and the rail 17 is disposed in both embodiments approximately half-way the height of the milking parlour on the longitudinal side of the fencing 2, i.e. on that side where the robot arm construction is located. The supporting unit 15 is provided both on its upper side and on its lower side with rolls 18, 19 and 20. The supporting unit 15 can be moved along the rails 16, 17 by means of a (non-shown) actuator whose point of application on the supporting unit 15 is indicated by reference numeral 21. The first horizontal axis 7 and the second horizontal axis 8 are disposed on the supporting unit 15, and the second point of application 11 of the second actuator 9 and the second point of application 14 of the first actuator 12 engage the supporting unit 15.

In the embodiment shown the device is provided with a position-determining device 22 known per se for determining the position of a teat of a cow. The position-determining device 22 is disposed near the end of the third robot arm construction portion 4, but may alternatively be fastened in another place, for example on the fencing 2. At least one actuator, but preferably all the actuators, is controllable with the aid of data from the position-determining device 22, if desired through a computer.

Although the invention is described with reference to a robot arm construction that is connected to the fencing surrounding the milking parlour, the invention is not limited thereto. The robot arm construction and/or the supporting unit may alternatively be disposed on the ceiling or on the floor of the space where the device according to the invention is arranged.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for use in a milking parlour for automatically milking an animal using a milking robot, the device comprising a robot arm construction for automatically connecting a teat cup to a teat of the animal to be milked, the robot arm construction comprising:
    a first robot arm construction portion;
    a second robot arm construction portion;
    a first generally horizontal axis at which the first robot arm construction portion pivots;
    a second generally horizontal axis at which the second robot arm construction portion is pivotably connected to the first robot arm construction portion;
    a third robot arm construction portion for carrying a teat cup, the third robot arm construction portion being connected to the second robot arm construction portion for pivotable movement under the udder of the animal; and
    a first actuator for moving the first robot arm construction portion, having a first point of application on the first robot arm construction portion and having a second point of application located below the first generally horizontal axis and below the first point of application.

2. The device as claimed in claim 1, wherein a fencing surrounds the milking parlour and the first robot arm construction portion is pivotably connected to an upper side of the fencing at the first horizontal axis and the second horizontal axis is located outside the milking parlour.

3. The device as claimed in claim 2, wherein the second point of application of the first actuator is located on the fencing at a place located at a first distance below the first horizontal axis.

4. The device as claimed in claim 3, wherein the robot arm construction comprises a second actuator having a first point of application on the second robot arm construction portion and having a second point of application on the fencing at a place located a second distance below the first generally horizontal axis, the second distance being less than the first distance.

5. The device as claimed in claim 4, wherein the first point of application on the second robot arm construction portion is located at least approximately half-way along the second robot arm construction portion.

6. The device as claimed in claim 4, wherein the first point of application on the second robot arm construction portion is located on a side of the second robot arm construction portion located facing the fencing.

7. The device as claimed in claim 2, wherein the robot arm construction comprises a second actuator having a first point of application on the second robot arm construction portion and having a second point of application on the fencing at a place located a second distance below the first generally horizontal axis.

8. The device as claimed in claim 7, further comprising a position-determining device for determining the position of a teat of a cow, the second actuator being controllable with the aid of data from the position-determining device.

9. The device as claimed in claim 2, wherein the third robot arm construction portion is pivotally connected to the second robot arm construction portion.

10. The device as claimed in claim 1, wherein the first point of application on the first robot arm construction portion is located closer to the second horizontal axis than to the first horizontal axis.

11. The device as claimed in claim 1, wherein the first point of application on the first robot arm construction portion faces the third robot arm construction portion.

12. The device as claimed in claim 1, wherein a fencing surrounds the milking parlour and the device comprises a supporting unit movable along the fencing, the first robot arm construction portion being pivotably connected to the supporting unit at the first horizontal axis.

13. The device as claimed in claim 12, wherein the first actuator has a second point of application on the supporting unit and wherein the robot arm construction comprises a second actuator having a first point of application on the second robot arm construction portion and having a second point of application on the supporting unit.

14. The device as claimed in claim 13, wherein the supporting unit is movable along two rails that are disposed at different levels on the fencing.

15. The device as claimed in claim 14, wherein the supporting unit is movable along the rails by means of a third actuator.

16. The device as claimed in claim 1, further comprising a position-determining device for determining the position of a teat of a cow, the first actuator being controllable with the aid of data from the position-determining device.

17. The device as claimed in claim 1, wherein the third robot arm construction portion is pivotally connected to the second robot arm construction portion.

18. The device as claimed in claim 1, wherein the third robot arm construction portion is rigidly connected to the second robot arm construction portion.

19. The device as claimed in claim 1, wherein the robot arm construction further comprises a second actuator having a point of application on the second robot arm construction portion and the first and second actuators cross one another.

20. A device for automatically milking an animal, the device comprising:
   a milking parlour comprising a fencing; and
   a milking robot, including a robot arm construction for automatically connecting a teat cup to a teat of the animal to be milked, wherein the robot arm construction comprises:
   a first robot arm construction portion;
   a second robot arm construction portion;
   a first generally horizontal axis at which the first robot arm construction portion pivots with respect to the fencing;
   a second generally horizontal axis at which the second robot arm construction portion is pivotably connected to the first robot arm construction portion;
   a third robot arm construction portion for carrying a teat cup, the third robot arm construction portion being connected to the second robot arm construction portion for pivotable movement under the udder of the animal; and
   a first actuator having a first point of application on the first robot arm construction portion and having a second point of application on the fencing located a first distance generally below the first generally horizontal axis and below the first point of application.

21. The device as claimed in claim 20, wherein the third robot arm construction portion is rigidly connected to the second robot arm construction portion.

22. The device as claimed in claim 20, wherein the robot arm construction further comprises a second actuator having a first point of application on the second robot arm construction portion and a second point of application on the fencing at a place located a second distance below the first generally horizontal axis, the second distance being less than the first distance, and whereby the first and second actuators cross one another.

* * * * *